Jan. 30, 1962  E. J. WESLEY  3,019,339
RADIAC ALARM DOSIMETER
Filed Dec. 12, 1958  3 Sheets-Sheet 1

INVENTOR.
EDWARD J. WESLEY
BY
ATTORNEYS

INVENTOR.
EDWARD J. WESLEY

INVENTOR.
EDWARD J. WESLEY
BY
ATTORNEYS 3,019,339
RADIAC ALARM DOSIMETER
Edward J. Wesley, San Mateo, Calif., assignor to the United States of America as represented by the Secretary of the Navy
Filed Dec. 12, 1958, Ser. No. 780,173
6 Claims. (Cl. 250—83.6)
(Granted under Title 35, U.S. Code (1952), sec. 266)

The invention described herein may be manufactured and used by or for the Government of the United States of America for governmental purposes without the payment of any royalties thereon or therefor.

This invention relates to a dosimeter and particularly to a dosimeter circuit which has a high impedance input and a low impedance output having circuitry associated therewith that effects a stable action over a wide range of battery voltage.

Instruments that may be used to identify and evaluate radiological hazards are well recognized. The information so obtained may be used to eliminate and avoid radiological hazards and it is well known that the type of instrument ideal for each situation, namely each radiological hazard, will be different. Basically, two meaesurements from a contaminated area are of interest, and hence two types of radiac instruments are required. Generally these involve a doserate meter and a dosimeter. A doserate meter may be used to evaluate the roentgen intensity and potential hazard of an irradiating gamma flux whereas a dosimeter measures the roentgen dosage absorbed by the atmosphere in a particular area during any specific period, say a working day, and gives a measure of the physical damage which a body in the immediate vicinity has received during such period. Both instruments have a place in the general disaster situation. The doserate meter is valuable in alerting the user of local "hot spots" or highly contaminated areas whereas the dosimeter measures the roentgen dosage to definitely indicate that the working period for a permitted dose has ended.

Various recycling dosimeters have been built, such as recycling alarm types. The alarm type sounds an alarm after a single preset dose has been received and some alarm types have meter indications of the dose prior to the actual alarm. The other recycling dosimeters operate on large increments. Both instruments are little more than elaborate dosimeters since the rate indication feature is completely inadequate for indicating potentially dangerous radiation fields. These instruments have the deficiency of being inaccurate due to leakage currents and/or dead time. At medium doserates the deficiency comes from variations of voltage swing springing from temperature and battery voltage variations.

The ideal recycling dosimeter should suffice as the only necessary instrument for a party entering a contaminated area. Thus, the only adidtional indicator needed would be a casualty range dosimeter (permanent record) which could be worn by each individual in the contaminated area. The particular recycling dosimeter employed should cover a wide range of energy so it can audibly indicate dangerous dose rates as well as a prescribed dose. In addition, since the recycling dosimeter is to be used in the field, a small and portable device should be employed.

Therefore, the primary object of this invention is to provide a circuit for a single recycling dosimeter which gives definite dose and doserate information to parties in a radiologically contaminated area.

Another object is to provide a circuit for a dosimeter that accurately covers a wide range of energy from radiation for audibly indicating a dangerous doserate as well as a prescribed dose.

Still another object is to provide a circuit for a dosimeter that may be used as a reader and charger and which is stable in operation over a wide range of battery voltage.

Yet another object is to provide a recycling dosimeter which operates on a small power supply so that a small and portable instrument may be provided.

According to this invention, a circuit that may be used as a reader and charging circuit in a recycling dosimeter has been provided. It functions on a high impedance input and low impedance output and involves a detector that responds to radiation in accordance with the strength of an impinging radiation field. A triggering circuit is provided to receive the response from the detector and a positive feedback loop is interposed between the detector and triggering circuit to bring about a stable and uniform pulse of relatively large magnitude from the triggering circuit.

More particularly, the high impedance input and low impedance output is effected by a hybrid tube-transistor circuit having the high impedance characteristics of a tube and the low impedance characteristics of a transistor. The triggering circuit associated with the hybrid circuit involves a blocking oscillator having a postive feedback loop and an additional coil winding which is interposed between the oscillator and detector to provide an additional positive feedback loop to effect the stable and uniform pulse. This latter winding replenishes all, or substantially all, of the charge within the detector, thereby effecting the stated stable and uniform pulse.

Many of the attendant advantages of this invention will be readily appreciated as the same becomes better understood by reference to the following detailed description when considered in connection with the accompanying drawings.

Figure 3:
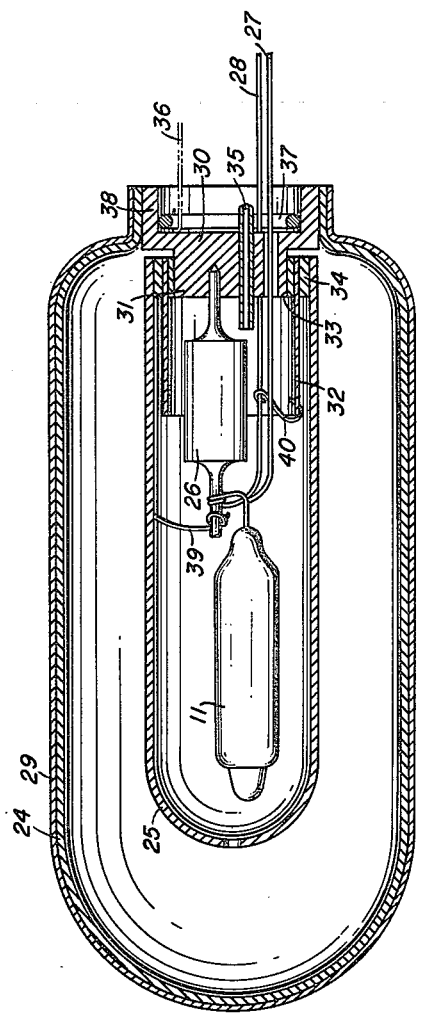
FIG. 3 shows a cross sectional view of a detector assembly that may be employed by this invention.
Figure 4:
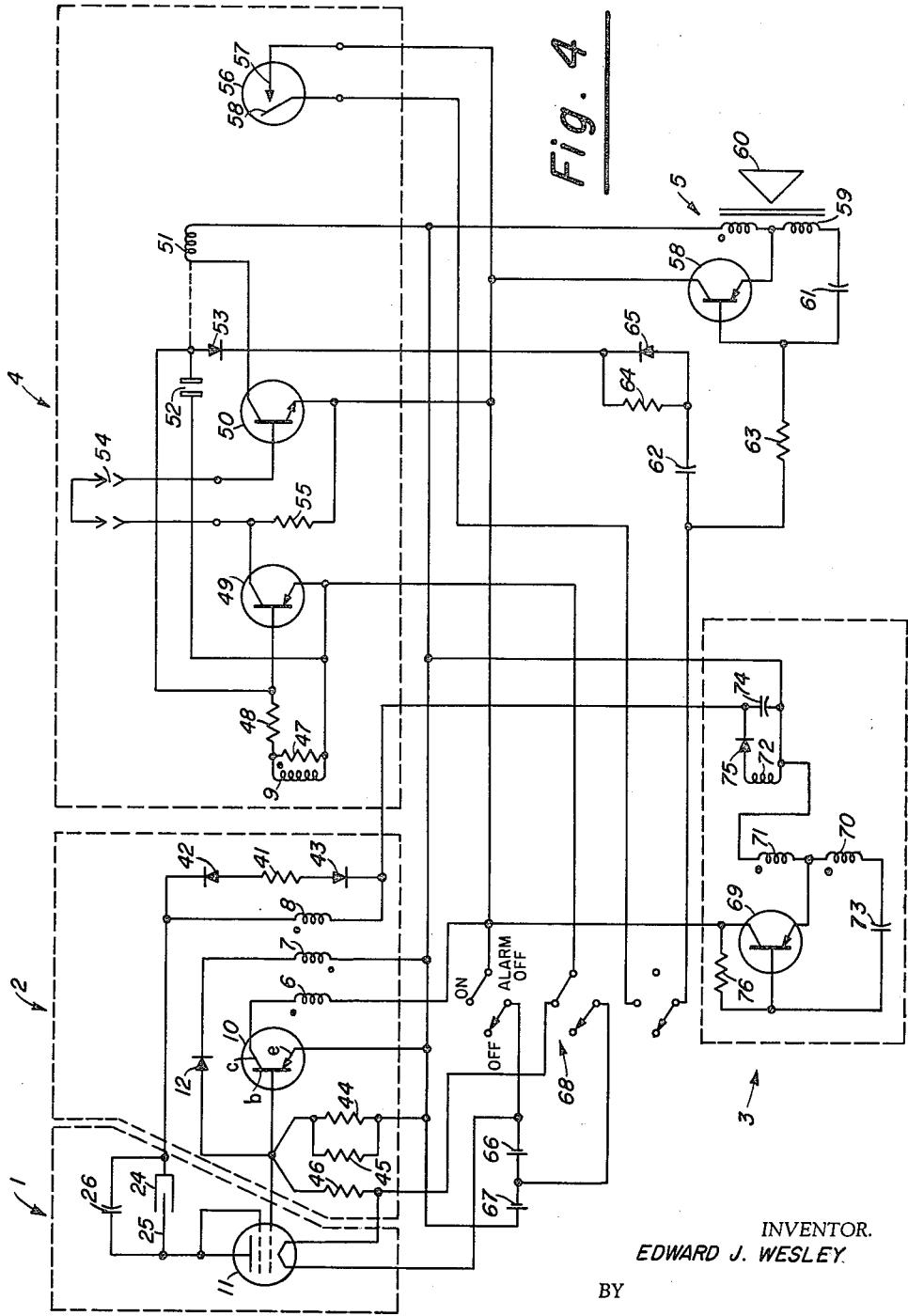
FIG. 4 shows a wiring diagram for a radiac alarm dosimeter utilizing the circuitry of this invention.

By reference to the drawings, and particularly FIG. 4, the basic essentials of the radiac alarm dosimeter may be seen. These involve a detector 1 (also shown in FIG. 3), a triggering circuit 2 for receiving a response from the detector, a suitable power supply 3, a transistor switch arrangement 4 which includes the register coil that actuates the register, and the alarm sounding mechanism 5.

Preferably, a detector such as the ion chamber of FIG. 3 is used in this instrument which has a high impedance element sealed therein.

The vital portion of the circuit of the invention is involved in the triggering circuit 2 which has double positive feedback characteristics. Since the return of a fraction of the electrical output of the oscillator is in phase with the input, the positive feedback or regeneration increases the amplification. The loops are made possible in this circuit by coil windings 6, 7 and 8 which are wound in or out of phase with each other as shown in the drawing and a winding 9 is associated with these coils to drive the register or switch circuit 4. The first feedback loop involves transistor 10, primary winding 6, winding 8, and the normal plate of tube 11. The second feedback loop involves transistor 10, winding 6, winding 7, diode 12 and the transistor base.

The power supply 3 may be powered by flashlight batteries and is sufficiently small to be carried with little encumbrance to the supporter.

Transistor switch 4 actuates a mechanical register (not shown) which indicates the accumulated dose and also operates an audible sounder which is actuated each time the unit of dose reaches a prescribed magnitude. In addition, an alarm sounder circuit 5 is associated with the major portion of the dosimeter circuit in some suitable manner such as shown in FIG. 4, so as to function electrically to actuate the alarm sounder, thereby giving a warning of impending danger.

Figure 1:
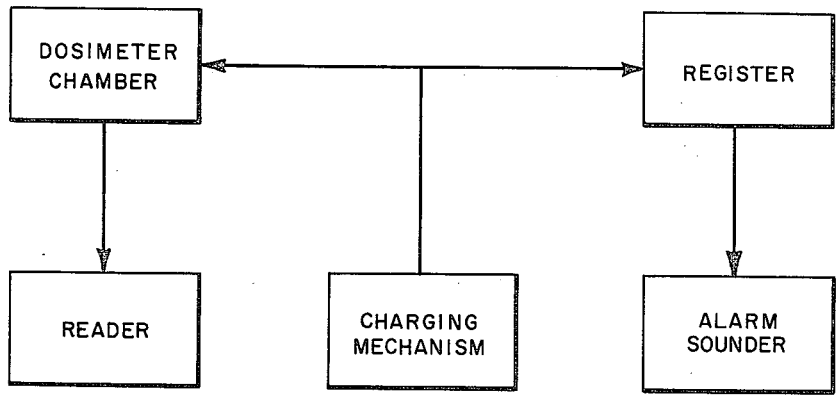
FIG. 1 shows a block diagram of a recycling dosimeter system.

By referring to FIG. 1, the overall performance during a cycle of a registering dose may be seen. Basically, the recycling alarm type dosimeter and the alarm type dosimeter comprise some five sub-combinations, namely, a detector shown as a dosimeter chamber, a reader, a charging mechanism, a totalizing register, and an alarm sounder. The detector may amount to nothing more than the usual ion chamber which is charged electrically and then isolated from its charging source. Upon impingement of it by radiation, a volume of gas therein is caused to discharge. The reader, which is a suitable electrical circuit, senses the voltage or charge on the detector chamber and at some pre-established lower voltage actuates the charging mechanism which also involves an electrical circuit, and such actuation causes the charger to re-establish the original voltage on the detector and to drive the mechanical register one increment. The mechanical register and alarm sounder are associated so that upon such actuation of the register, the sounder gives an audible click. At the conclusion of the charge cycle, the detector is again isolated and thereby again becomes capable of discharge due to impinging radiation.

Figure 2:
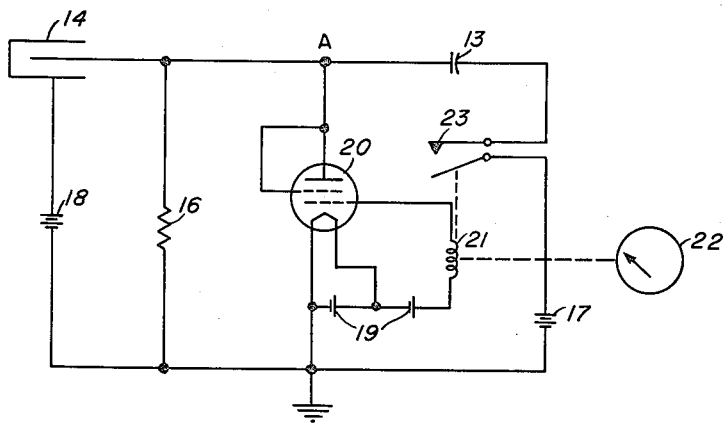
FIG. 2 shows an operating circuit of a simple recycling dosimeter.

The theories and structure involved in a simple recycling system may be considered by referring to FIG. 2. This system has all the essential features necessary for general evaluation purposes. Condenser 13 is the equivalent of the total capacitance from the chamber 14 to ground shown in FIGS. 2, 3, and 4. The yield of the detector is in coulombs per roentgen. Resistor 16 is the equivalent of the leakage resistance of the chamber system to ground. The maximum voltage from point A to ground occurs at the start of the cycle, while voltage source 18 is the extra chamber polarizing voltage. The minimum voltage is the smallest voltage from point A to ground at the time of the recycle.

The increment size can be set by choosing the three variables, namely, total capacitance 13, the difference between the maximum voltage 17 and the minimum voltage, and the yield of the detector measured in coulombs per roentgen. Hence, the increment size is equal to the product of the total capacitance and the difference between the maximum voltage 17 and the minimum voltage which is then divided by the yield of the detector.

The inherent nature of such a circuit causes any instantaneous voltage across the leakage resistor 16 to vary. Filament voltage 19 supplies tube 20, as shown in FIG. 2, and coil 21 ultimately actuates indicator 22 and switch 23.

Various errors and difficulties arise from employment of such recycling dosimeters, such as the energy spectral dependence of the unit. The chamber polarizing voltage minimizes the doserate dependence of the detector. However, the difference between the maximum and minimum voltage swings does vary with temperature and battery voltage changes. The accuracy of such an instrument is also affected by leakage currents which affects the range of doserate coverage the dead time (recharging time of the circuit) which also affects the range of coverage. Therefore, the overcoming of these deficiencies is included in the features of this invention.

The particular detector, used in an instrument employing the circuit of this invention, may be any suitable type. Preferably, a detector such as the one shown in FIG. 3 is used, which is no part of the present invention, but which has proven itself to be highly efficient. This particular detector, designed by H. R. Wasson, has an energy response paralleling the roentgen air dose within plus or minus 20% from 80 kev. to some 2 mev. Such a wide range of energy coverage is pertinent when this detector is used in conjunction with the circuit of the present invention since a wide range of energy coverage is one of its significant features. The detector may be positioned near one end of the instrument so that it has an unobstructed view of the impinging radiation from all but a solid angle of approximately 1.5 steradians in the direction of the electronic circuit and batteries.

The ionization chamber of FIG. 3 has the usual essential elements of such a detector namely, a shell 24 made of suitable material, such as spun aluminum, and a center electrode 25 of similar material. One important feature of this particular detector is that the high impedance tube 11 and a calibrating capacitor 26, along with suitable filament leads 27, 28, and a grid lead (not shown) are sealed within the detecting housing 24, thereby providing a small compact, yet efficient detecting unit. For shielding purposes, a lead shield 29 may encircle the detector shell 24. The detector assembly is provided with an opening in one end thereof where an aluminum end plug 30, having a riser 31, is positioned. An aluminum guard ring 32 may be supported on the riser and insulated therefrom by epoxy board inner (33) and outer (34) insulators. A suitable copper fill tube 35 is also located in an aperture of plug 30.

The high voltage supply is brought to the shell of the chamber by lead 36 which is attached to conducting connector ring 37 positioned against annulus 38 of plug 30. The calibrating capacitor 26 may be supported on end plug 30 by a suitable notch provided therein. The remaining circuitry within the gas filled chamber is shown, generally by numerals 39, 40.

Since radiac alarm dosimeters function on minute amounts of currents effected by the impinging radiation, it is necessary to provide a circuit which functions efficiently under such conditions. Further, since it is necessary to have sufficient current, and therefore power, to drive an alarm system, it is also necessary to provide some means for a relatively large amount of current. This circuit, which involves a hybrid tube-transistor arrangement and which operates on a high impedance, but nevertheless providing a relatively large amount of current for driving a register or the like, is considered an important feature of the invention since the detecting chamber utilized in this instance will have, for example, some 10 milli-roentgens per hour impinging thereon, and hence, the current therein is minute, such as 10 to the minus 13th power, but the current required to drive the register and alarm is somewhat greater.

The particular vacuum tube 11 employed for this purpose is not significant if its input impedance is high, such as a CK-5886 having an input impedance of some 10 to the 15th power in ohms and that establishes an output impedance at the normal grid of approximately 5000 ohms. By the same token, the particular transistor 10 that is utilized is not too significant if a triode or greater multi-element active element is used. Therefore, a PNP type, as shown in FIG. 4, having collector ($c$), base ($b$), and emitter ($e$) electrodes may be utilized.

By again referring to FIG. 4, the detector, along with the triggering portion of the circuit, may be considered further. As stated, an important feature of this invention is the provision of the hybrid tube-transistor blocking oscillator circuit having high input impedance and low output impedance. Another important feature of the invention, however, lies in the use of the winding coils 6, 7, and 8, which are associated with the rest of the circuit in such a manner that two positive feedback loops are possible.

In consideration of the first loop, the transistor 10 begins to conduct in response to conduction of tube 11 effected by impinging radiation on chamber 24 and the transformer primary 6 has current passed therethrough, which in turn affects winding 8 which sends current into the normal plate of the tube 11. When the plate of the tube is very negative, no current flows through the grid of the tube and the only coupling from plate to grid is through the interelectrode capacitance of the tube. This is not sufficient under ordinary circumstances to permit the unit to go through a blocking oscillator cycle. When the grid current is permitted to flow at some smaller negative plate potential, such as after charge dissipation in the detector under irradiation, the coupling from plate to grid is through the electron stream from filament to grid. At some particular value of current, the tube transconductance from plate to grid is such that the loop gain is unity or greater and the unit proceeds to oscillate and block in the normal manner. At this time, a voltage spike appears across winding 7 and brings the second oscillator loop into play. Up to this time, the normal triggering signals in a blocking oscillator, noise, etc., have been small compared to the small voltage necessary to get conduction through the diode 12 in the forward direction. With the spike from the initial loop, however, this second loop regenerates power, and because it is a much lower impedance loop, power delivered to the transformer is greatly increased. During the drive pulse, a large positive voltage appears across the winding 8 which tends to drive the plate of the tube positive. However, at approximately zero plate potential, or slightly below, the filament to plate becomes a good conductor and clamps the plate at the zero potential. The voltage which appears across winding 8 is then impressed across the condenser 26 which is charged by conduction through the tube to the peak voltage. Upon completion of the blocking cycle, the voltage across winding 8 is zero and the plate of tube 11 and condenser 26 are charged negatively to the peak voltage.

An important feature of the invention resides in the use of winding 8 which is connected to the detector chamber and its condenser 26 so upon a pulse from the detector a pulse appears on the base (b) of the transistor which starts the blocking oscillator action. Hence, on the same portion of the cycle, the feedback from the collector (c), winding 6 is coupled back to the condenser by winding 8 thereby fully discharging condenser 26 which has its discharge coupled to the base (b) which causes more positive blocking oscillator action. As the current through winding 8 decreases the inductive action causes the exact reverse to take place.

The purpose of condenser 26, as well as capacitance 13 of FIG. 2, is to calibrate the circuit since the electrical charge within chamber 24 must subsequently be discharged. In addition, it becomes an essential part of the feedback loop wherein winding 8 is involved but this is rather insignificant as far as the loop gain is concerned. Further, it filters and smooths the pulse from the detecting chamber 24, but this is one of its secondary functions. In the instant circuit condenser 26 may be of some suitable value, such as 200 micromicrofarads.

In respect to calibrating, resistor 41 is provided that calibrates the size of the dose increment and it may range in size between 50 and 300 ohms for the instant circuit. This resistor provides a fine adjustment over a small range by adjusting the value of the recycling increment by controlling the peak voltage excursion of winding 8. Diode 42, which is in series with calibrating resistor 41, clamps the voltage rather tightly but resistor 41 has a voltage developed across it as well and their sum is the voltage seen by capacitor 26 and tube 11. This diode may be of some suitable type such as a 1N205, 1N206 or 1N207, of the silicon diode type. Therefore, calibration is accomplished by the choice of diode 42 and resistor 41 at the time of assembly of the circuit. No further calibration should be necessary unless the major components are changed, at which time a new clipping diode 42 may be installed. Since diode 42 operates in zener operation across winding 8 it thereby establishes the voltage applied to the dosimeter independently of the battery voltage decline effected by operating drain.

Also closely associated with diode 42 and resistor 41 is a diode 43 that open circuits the voltage referencing across winding 8 and permits energy stored in the transformer to activate (via winding 9) the register driving circuit indicated by switch circuit 4. This diode is in series with zener diode 42 and resistor 41, and conducts on the charging spike but unloads high turns winding 8 on the flyback when all the energy is needed in register circuit 4. If this diode, which may be of a 1N457 type, were not included in the circuit substantially as shown by FIG. 4, resistor 41 and diode 42 would be the only electrical elements across winding 8 and hence, an electrical short would be present, thereby dissipating the energy of the flyback. Thus, under such circumstances, the register drive circuit (4) would not receive an activating pulse. This is an important feature since it conserves energy which is important when utilizing a small current power supply.

Diode 12, in the feedback loop of winding 7, functions to isolate this loop and make it inactive until the amplitude of the signal in winding 7 exceeds the forward break down voltage of the diode itself, which is of a suitable type, such as a 1N457. Once this voltage spike appears, its purpose subsides since the oscillator action is in winding 8, etc. Without diode 12, winding 7 would be in continual oscillation.

As indicated, the flyback power must be delivered to the output or register circuit 4 and not dissipated in some other winding. Diode 12 also satisfies this purpose since its forward conduction for the make portion of the pulse and any flyback voltages are such as to drive current across diode 12 in the reverse direction, thereby isolating winding 7.

The particular number of turns of each of the windings 6, 7, 8 and 9 is dependent upon the effect each winding is to have on the remaining portion of the circuit. In accordance, therefore, and as a mere example, winding 6 may be 75 turns, winding 7, 300 turns, winding 8, 4000 turns and winding 9, 125. The windings are wound in or out of phase as indicated by the drawing for the obvious purpose of effecting the oscillating action and positive feedback action.

As shown in FIG. 4, resistors 44, 45, 46, of some suitable size, such as 680 ohms, 18K ohms, respectively, are provided in the trigger circuit and connected to the base (b) and grid of tube 11, as shown, to perform their function of controlling the flow of current.

Transistor switch circuit 4, is provided for amplification purposes, thereby driving the register (not shown). The function of winding 9 has been indicated as well as its description. Two isolation resistors 47, 48, ranging in size between 1K to 10K ohms are shown in this circuit. Also, two multi-element transistors 49 and 50, of suitable type, are employed that actuate a coil 51 that drives the register and an increment contactor 52 that is connected to a transistor diode 53. For remote operation the circuit is broken at 54 between transistors 49, 50, thereby disabling coil 51. Another resistor 55, of some 30 ohms, is provided in the switch or register circuit, and as shown in the drawing, is connected to the collector of transistor 49 and across the emitter of power transistor 50. This resistor, primarily is for stabilizing the operation of the switch circuit 4 with temperature variation. A drum 56 of the register drive carries the contacts 56, 57, for the alarm system 5.

It should be noted that in accordance with the present invention the alarm is energized by electrical contacts on the register and that these contacts close at a preset number of register increments. Hence, the size of the increments is significant since these increments and their number will ultimately cause the alarm sounder to be actuated to indicate what level of danger is involved. The magnitude in reontgens of the recycling increments are dependent on various considerations, namely, the total number of increments that can be counted on the register, the maximum size of the register, the total dose to be integrated, the maximum radiation doserate to be integrated, and the need for a recycling rate required for emphasis, and hence, the cycle click ratio that would appear significant to an observer in a potentially dangerous field.

As to the total number of increments that can be counted on the register and the maximum feed of the register, any suitable register may be employed which possesses the units or capabilities desired. As to the total dose to be integrated, this is governed by lethality and proposed permissible dosages. As an example, if approximately a 600 roentgen dose is lethal to most humans and up to 25 roentgens is the range of dosages considered allowable in discussions of single tactical situations, the total dose which the register must integrate is at least 25 roentgens but need not greatly exceed some 600 roentgens. The question of the maximum doserate to be integrated has two aspects, namely, the top doserate specified for disaster rate meters, as for example, some 500 roentgens per hour, and the dosimeter should possess the mechanical capabilities of integrating to this point. The last characteristic to consider is the increment best suited to the recognition of potentially dangerous fields. This feature depends upon the recognition of the dangerous field by human perceptiveness under all situations. Experience indicates that the rate of one click per ten seconds would be the rate of threshold of significance.

The alarm system 5 comprises circuitry adequate for its function, namely a transistor 58, and transformer 59 with suitable windings to actuate an alarm 60. Suitable elements such as a 100 microfarad condenser 61, a 0.25 microfarad condenser 62, a 6K ohm resistor 63, a 1 megohm resistor 64, and a diode 65 are provided in the alarm circuit 5 for their usual purpose and in a manner shown in FIG. 4.

The power supply is small and easily carried since only a small current supply is required. Hence battery cells 66, 67, of some 1.5 volts each, may be used. A wafer switch 68 is utilized for off, on, and alarm off, positions. The alarm sounder is energized at each cycle of the register as a sounder and is free running as an alarm when the alarm contacts on the register are closed. The alarm off position disables only the alarm contact circuit and does not interfere with the operation as a sounder. Hence, an alarm is available which can be used to sound at a preset total dose, thereby warning the whole party of impending danger. The power supply also includes transistor 69, windings, 70, 71, and 72, a 1 microfarad condenser 73, a 0.01 microfarad condenser 74, transistor diode 75 and 15K resistor 76. These elements are employed in the power supply in a manner shown, for example, in FIG. 4.

In use, the radiation impinging gas filled chamber 24, of detecting unit 1, effects ionization so that tube 11, having a high impedance input, conducts. Such conduction generates a response in accordance with the strength of the impinging radiation field and such response is directed to the triggering portion (10, 6, 7, 8) of circuit 2. The triggering circuit involves a blocking oscillator having transistor 10 as its active element, thereby having a low impedance, and windings 6 and 7. These windings are wound so the current flow therein is out of phase, and hence, the oscillator operates in its usual blocking manner.

Two positive feedback loops are employed, the first loop involving transistor 10, winding 6, winding 8, and the normal plate of tube 11. The second loop involves windings 6 and 7, diode 12, and the base (b) of transistor 10. Winding 8 is interposed between the blocking oscillator and the detecting unit and is connected to condenser 26 that acts as a rough calibration device in which the charge that must subsequently be dissipated by chamber 24, is stored or placed. Winding 8 tends to drive the plate of tube 11 positive. The action of winding 8 effects a complete, or substantially complete, dissipation of electrical charge from the detecting chamber 24 and also provides sufficient voltage to cause the triggering portion of the circuit to effect a uniform, stable pulse of large amplitude to drive register circuit 4.

Since the circuit employs a hybrid tube-transistor circuit it operates on a minute current and at the same time functions to drive a load, namely a register and alarm, that requires a relatively large current for its performance. The hybrid feature of the circuit, when coupled with the positive feedback windings, and particularly winding 8, covers a wide range of impinging radiation and operates on a wide range of battery voltage, and therefore the radiation field covered is not so spectrally dependent nor is any dead time (recharging time of the circuit) any substantial hindrance. Further, the leakage currents are reduced because of the high impedance of the input portion of the circuit, (tube 11).

Therefore, a recycling alarm dosimeter circuit has been developed for work parties of contaminated areas and may be used in a single instrument required for both dose and doserate evaluation and that functions as a reader and charging mechanism. The mechanical register (not shown) is driven by circuit 4 without difficulty since the energy available in the transformer windings 6, 7, and 8, become available for winding 9 that drives the register and alarm portion of the circuit. The instrument using this circuit will function on a wide range of battery voltage and a small current supply, and hence may be sufficiently small to be carried on the belt of the wearer without unduly encumbering him thereby providing a small, portable, radiac.

It should be understood that many obvious modifications and variations of the present invention are possible in light of the above teachings. It is therefore to be understood that within the scope of the matter being claimed that the invention may be practiced otherwise than specifically described.

What is claimed is:

1. A recycling dosimeter circuit having the combination of means for generating a response to radiation in accordance with the strength of a radiation field, means for receiving said generated response comprising a blocking oscillator having a transistor as an active element, and a plurality of transformer coupled feedback circuits interposed between said means for generating a response to radiation and said means for receiving said generated response whereby a uniform pulse of large amplitude is generated by the means for receiving the generated response.

2. A recycling dosimeter circuit having the combination of means for generating a response to radiation in accordance with the strength of a radiation field including a vacuum tube having relatively high impedance thereby operating on a minute electrical charge, means for receiving said generated response comprising a blocking oscillator having a transistor as an active element, the base of said transistor being connected to the grid of said vacuum tube and a plurality of transformer coupled feedback circuits interposed between said means for generating a response to radiation and said means for receiving said generated response whereby a pulse of large amplitude is generated by the means for receiving the generated response.

3. A recycling dosimeter circuit that functions on a high impedance input and a low impedance output thereby operating on a minute electrical charge having the combination of means for generating a response to radiation in accordance with the strength of a radiation field comprising a vacuum tube having relatively high impedance, means for receiving said generated response comprising a blocking oscillator having a transistor as an active element triggered by the generating means and transformer coupled feedback circuits interposed between said means for generating a response to radiation and said means for receiving said generated response whereby a pulse of large amplitude is generated by the means for receiving the generated response, said feedback circuits including a primary coil winding connected to the collector terminal of said transistor.

4. A radiac alarm system adapted for detecting and measuring radioactivity comprising in combination a detector circuit, a blocking oscillator triggering circuit coupled to the output of said detector circuit, said blocking oscillator triggering circuit including a transistor stage having its output connected to the primary of a transformer, a second feedback circuit connecting the second secondary of said transformer to the base of said transistor through a diode, and a mechanical register and alarm circuit connected to the output of said blocking oscillator triggering circuit for indicating radiation dosage rate and magnitude.

5. A radiac alarm system adapted for detecting and measuring radioactivity comprising in combination a detector circuit, a blocking oscillator triggering circuit coupled to the output of said detector circuit, said blocking oscillator triggering circuit including a transistor stage having its output connected to the primary of a transformer, a plurality of feedback circuits having their input connected to the secondary of said transformer, the first of said feedback circuits having its output connected directly to the input of said detector circuit, the second of said feedback circuits being connected through a diode to the input of said transistor stage, and a mechanical register and alarm circuit connected to the output of said blocking oscillator triggering circuit for indicating radiation dosage rate and magnitude.

6. A radiac alarm system adapted for detecting and measuring radioactivity comprising in combination a detector circuit, said detector circuit including a radiation detector and a vacuum tube, the output of said radiation detector being connected to the input of said vacuum tube; a blocking oscillator triggering circuit coupled to the output of said detector circuit, said blocking oscillator triggering circuit including a transistor stage having a transistor with a base, an emitter, and a collector, said blocking oscillator triggering circuit further including a plurality of transformer-coupled feedback circuits interconnecting said detector circuit and said transistor stage, the base of said transistor being connected to the output of said vacuum tube; and a mechanical register and alarm circuit connected to the output of said blocking oscillator triggering circuit for indicating radiation dosage rate and magnitude.

References Cited in the file of this patent

UNITED STATES PATENTS

| | | |
|---|---|---|
| 2,676,270 | Lahti | Apr. 20, 1954 |
| 2,738,925 | Lapham et al. | Mar. 20, 1956 |
| 2,838,680 | Bender et al. | June 10, 1958 |
| 2,874,305 | Wilson | Feb. 17, 1959 |